United States Patent
Natsume (10) Patent No.: US 7,680,405 B2
(45) Date of Patent: Mar. 16, 2010

(54) LENS OPERATION DEVICE AND CAMERA SYSTEM

(75) Inventor: Satoshi Natsume, Sagamihara (JP)

(73) Assignee: Canon Kabushiki Kaisha (JP)

( * ) Notice: Subject to any disclaimer, the term of this patent is extended or adjusted under 35 U.S.C. 154(b) by 392 days.

(21) Appl. No.: 11/457,204

(22) Filed: Jul. 13, 2006

(65) Prior Publication Data

US 2007/0014559 A1 Jan. 18, 2007

(30) Foreign Application Priority Data

Jul. 15, 2005 (JP) ............................. 2005-206767

(51) Int. Cl.
*G03B 17/00* (2006.01)
*H01R 33/955* (2006.01)
(52) U.S. Cl. ...................................... 396/85; 200/51.16
(58) Field of Classification Search .................. 396/85, 396/147, 281, 543, 131, 137, 297, 532; 200/51.16; 348/357, 345
See application file for complete search history.

(56) References Cited

U.S. PATENT DOCUMENTS 6,947,092 B1 * 9/2005 Nagata et al. ................ 348/345
2005/0036774 A1 * 2/2005 Katagishi ....................... 396/55

FOREIGN PATENT DOCUMENTS

| JP | 6-276421 | 9/1994 |
| JP | 11-271592 | 10/1999 |
| JP | 2002344777 A | * 11/2002 |

* cited by examiner

*Primary Examiner*—Melissa J Koval
*Assistant Examiner*—Autumn Parker
(74) *Attorney, Agent, or Firm*—Rossi, Kimms & McDowell LLP (57) ABSTRACT

The present invention provides a lens operation device connected to a lens apparatus and adapted to operate a function which the lens apparatus has. The structure of the lens operation device includes: a plurality of switches including an auxiliary switch; and a controller for detecting the function of the lens apparatus and for assigning execution of the function to the auxiliary switch.

8 Claims, 7 Drawing Sheets

LENS OPERATION DEVICE AND CAMERA SYSTEM

BACKGROUND OF THE INVENTION

1. Field of the Invention

The present invention relates to a lens operation device connected to a lens apparatus, such as a television lens or a video lens, and to a camera system equipped with the lens operation device and the lens apparatus.

2. Related Background Art

In a lens device used in a camera system for use in television broadcasting, video photographing, etc., there have conventionally been used a zoom demand or a focus demand which allows remote servo drive operation for zooming or focusing. In the demand, in particular, a thumb ring switch which is an operating member for zoom operation is provided. In addition, a switch for effecting enabling/disabling of a VTR (Video Tape Recorder), which is a recording apparatus, a return switch (RET switch) for displaying an image being taken by another person on a viewer, and an extender changeover switch, which is a switch for selectively inserting the 1× extender or 2× extender into the photography apparatus, are provided. Further, as mounted on various lens apparatuses such as apparatuses disclosed in Japanese Patent Application Laid-open No. H06-276421 and Japanese Patent Application Laid-open No. H11-271592, switches capable of performing various operations, such as an AUX switch for enabling/disabling functions such as quick zoom, shuttle shot and preset are provided.

When using an operating member of the conventional camera system, that is, the zoom demand and the focus demand, the functions of the camera system are set beforehand to the switches. To alter the functions, switch assignment positions, etc. thereof, it is necessary to effect re-setting by a separately provided function, for example, by an assignment position switching means through a connection to a PC or the like, a switching means within the lens apparatus, etc.

Further, when applying a demand to a lens apparatus endowed with a new function, there is a problem in that use of the demand becomes impossible when that function cannot be assigned to a switch by means of an assignment position switching device.

SUMMARY OF THE INVENTION

It is an object of the present invention to provide a lens operation device which, when connected to a lens apparatus, recognizes a kind and function of the lens apparatus, and automatically assigns the function thereof to a switch, and to a camera system using such a lens operation device and such a lens apparatus.

According to one aspect of the present invention, there is provided a lens operation device connected to a lens apparatus and adapted to operate a function with which the lens apparatus is endowed, the lens operation device including: a plurality of switches, which include an auxiliary switch; and a controller adapted to detect the function of the lens apparatus and to set execution of the function to the auxiliary switch.

The features of the present invention will become apparent from the following specific description of embodiments given with reference to the drawings.

DESCRIPTION OF THE PREFERRED EMBODIMENTS

In the following, embodiments of the present invention will be described in detail with reference to the drawings.

First Embodiment

Figure 1:
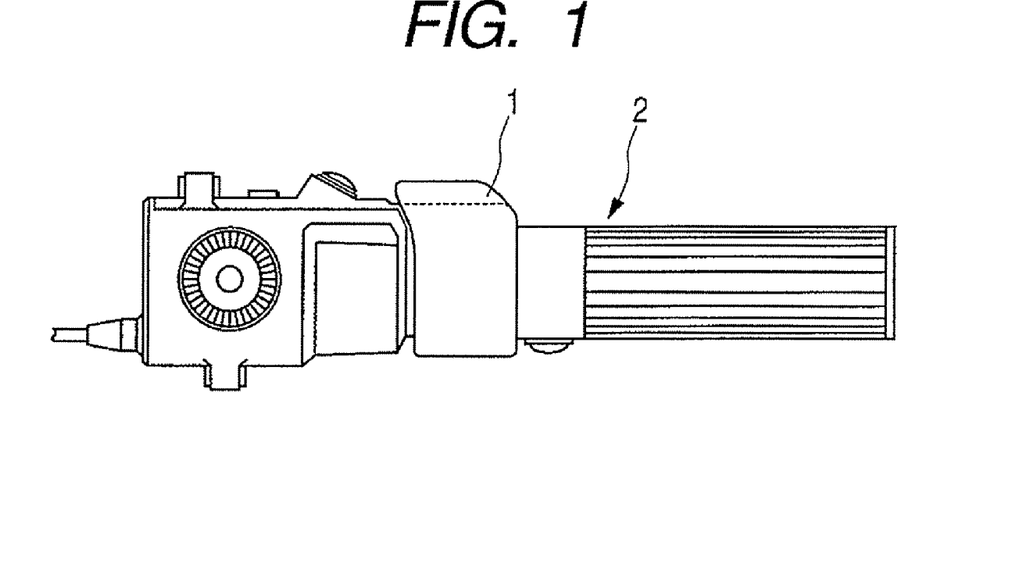
FIG. 1 is a structural view of a zoom demand according to first Embodiment.
Figure 2:
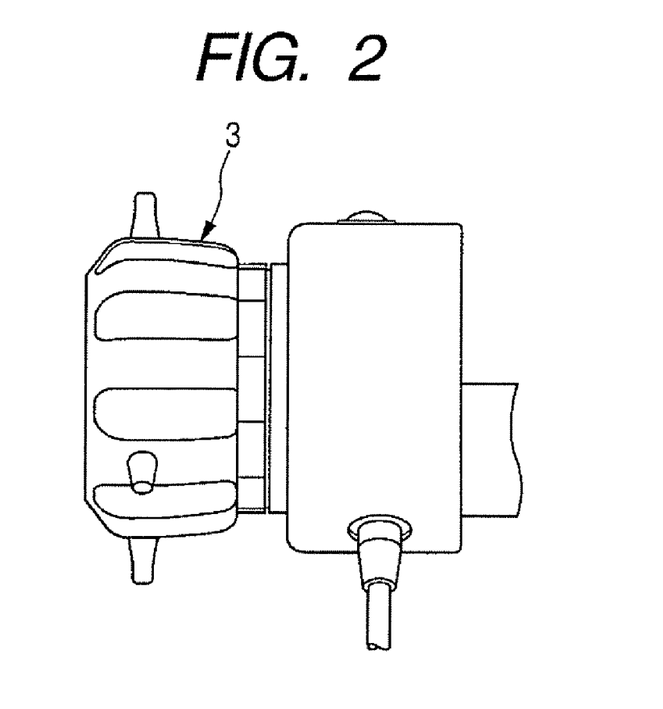
FIG. 2 is a structural view of a focus demand according to first Embodiment.

FIG. 1 shows a zoom demand 2 equipped with a zoom control switch 1 and to be connected to a camera system composed of a television camera and a lens apparatus, and FIG. 2 shows a focus demand 3 which is also to be connected to a camera system.

Figure 3:
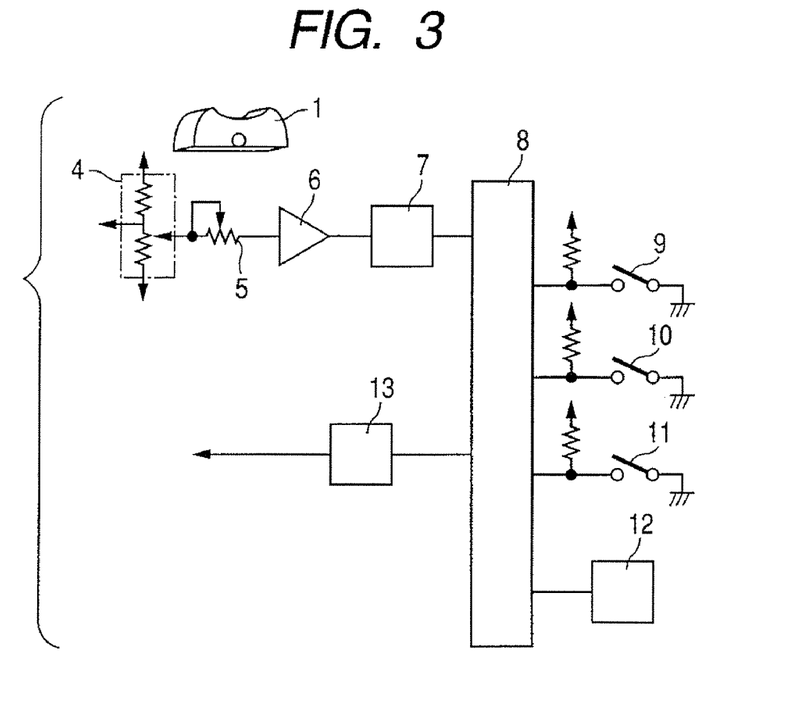
FIG. 3 is a block circuit diagram showing a circuit in the zoom demand according to first Embodiment.

FIG. 3 shows a block circuit diagram of the zoom demand 2. A command signal generating circuit 4 outputs a command signal which indicates a driving direction and a driving speed, both of which is in proportion to the operation amount of the zoom control switch 1, which is operated by an operator, in order to electrically drive a zoom lens optical system. The output of the command signal generating circuit 4 is connected to a CPU 8 for performing various control operations, recognition of an lens apparatus, assignment of a function to an auxiliary switch, i.e., AUX switch, and a setting operation via a zoom speed variable resistor 5, a command signal computing unit 6 for effecting signal level conversion and shift conversion, and an A/D converter circuit 7.

Connected to the CPU 8 are a VTR switch 9 for turning on/off a VTR mounted on a camera, and a return switch, i.e., RET switch, 10 for displaying an image being taken by another person through a view finder. Further connected to the CPU 8 are an auxiliary switch, i.e., AUX switch, 11 for effecting the enabling/disabling of functions with which the lens apparatus is endowed, such as quick zoom, shuttle shot, and preset, and an AUX user setting circuit 12 which allows the user to set a function that is to be assigned to the AUX switch 11. The output of the CPU 8 is connected to a communication conversion circuit 13 for effecting communication between lens apparatuses.

Quick zoom is a function in which, by keeping a switch depressed, zooming is effected temporarily to the telephoto end or the wide-angle end; when the switch is released, return to the original position is effected. Shuttle shot is a function in which an arbitrary zoom position can be stored and in which, solely by depressing a switch, zooming is quickly effected at that position; when the switch is released, return to the original zoom position is effected.

Preset function includes two functions: speed preset function and framing preset function. In the speed preset function, reproduction of a previously preset zoom speed can be effected any number of times solely by depressing a switch. In the framing preset function, a zoom position is preset; by depressing a switch, zooming can be effected from an arbitrary position to the preset position.

Figure 4:
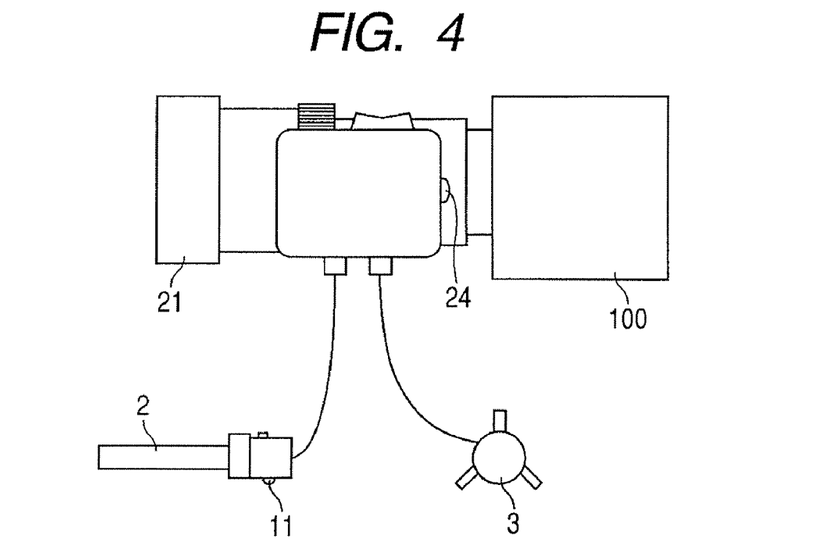
FIG. 4 is a schematic view of the zoom demand according to first Embodiment as connected to a lens apparatus.
Figure 5:
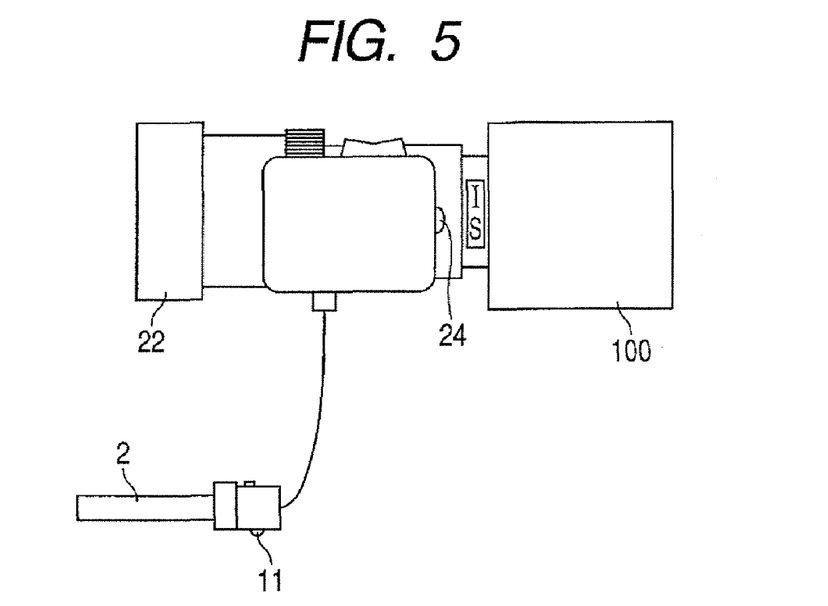
FIG. 5 is a schematic view of the zoom demand according to first Embodiment as connected to a lens apparatus.
Figure 6:
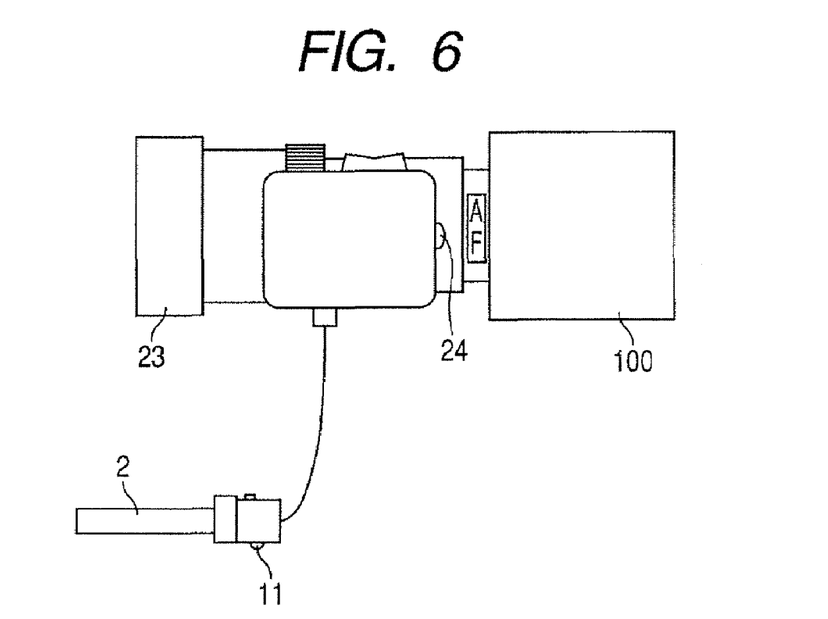
FIG. 6 is a schematic view of the zoom demand according to first Embodiment as connected to a lens apparatus.

FIGS. 4, 5 and 6 show examples of the connection of the AUX switch 11 to a lens apparatus, and camera systems. In FIG. 4, the zoom demand 2 equipped with the AUX switch 11 is connected to a lens apparatus 21 endowed with the shuttle shot function. The lens apparatus 21 is attached to a camera 100. In FIG. 5, the zoom demand 2 is connected to a lens apparatus 22 endowed with an image stabilizing function, i.e., IS. The lens apparatus 22 is attached to the camera 100. In FIG. 6, the zoom demand 2 is connected to a lens apparatus 23 endowed with an auto focus function, i.e., AF. The lens apparatus 23 is attached to the camera 100. Each of the lens apparatuses 21 through 23 is equipped with a shuttle shot switch 24.

Figure 7:
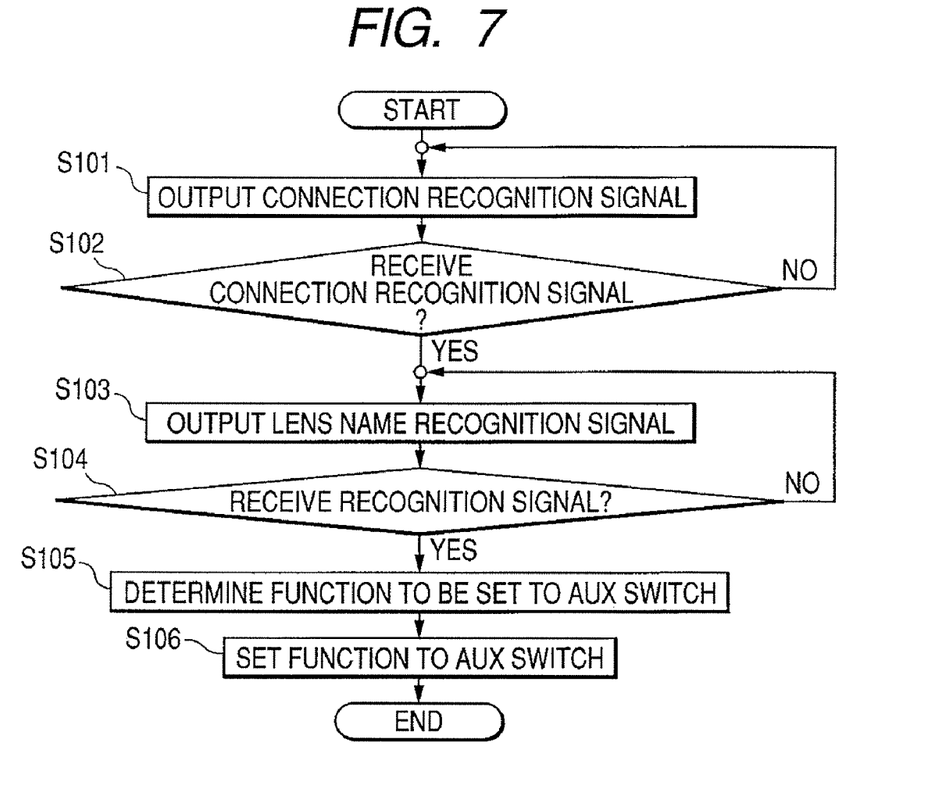
FIG. 7 is an operational flowchart of first Embodiment.

FIG. 7 shows an operational flowchart with which the zoom demand 2 is operated, while connected as shown in FIG. 4 in a case in which a camera system is fixed to a tripod or the like to perform photographing. Usually, in photographing of this mode, a zoom control switch and other switches of the lens apparatus 21 are not used, and the zoom control switch 1 of the zoom demand 2 is often used.

When the zoom demand 2 is connected to the lens apparatus 21, in Step S101, a connection recognition signal is transmitted from the zoom demand 2 side to the lens apparatus 21 side through the communication conversion circuit 13. When the lens apparatus 21 and the zoom demand 2 are thus connected together, and the power source of the zoom demand 2 is turned on, it is possible to check whether the lens apparatus 21 side is capable of communicating with the zoom demand 2 or not.

Next, in Step S102, the zoom demand 2 side waits for a response signal from the lens apparatus 21 upon the connection recognition signal; when no response signal is received, the procedure returns to Step S101 in order to output a connection recognition signal again. When a response signal upon the connection recognition signal is confirmed, the lens apparatus 21 and the zoom demand 2 are in a state in which they can perform communication, and the procedure advances to Step S103.

When the communicable state is secured, the lens apparatus 21 outputs a lens name recognition signal in Step S103 in order to determine the function to be assigned to the AUX switch 11 on the zoom demand 2 side. The lens name indicates the function with which the lens is endowed; when the lens name is recognized on the zoom demand 2 side, the function with which the lens is endowed is judged and recognized on the zoom demand 2 side.

For example, as shown in FIGS. 4, 5 and 6, when the zoom demand 2 is respectively connected to the lens apparatuses 21 through 23, the lens names are transmitted from the lens apparatuses 21 through 23 side. In the case in which, for example, the zoom demand 2 is connected to the lens apparatus 21 shown in FIG. 4, it is recognized on the zoom demand 2 side that the lens apparatus connected thereto is the lens apparatus 21 endowed with the shuttle shot function based on the transmitted lens name. In a case in which the zoom demand 2 is connected to the lens apparatus 22 shown in FIG. 5, the lens apparatus 22 is recognized to be one endowed with the IS function; in the case in which the zoom demand 2 is connected to the lens apparatus 23 shown in FIG. 6, the lens apparatus 23 is recognized to be one endowed with an auto focus function.

In Step S104, when the lens name cannot be recognized, the procedure returns to Step S103, and a lens name recognition signal is output again. When the lens name has been recognized, the procedure advances to Step S105, where the function to be set to the AUX switch 11 of the zoom demand 2 is determined based on the obtained lens name.

In an ordinary broadcasting lens, of the special functions of a lens apparatus, a higher priority in arrangement is given to a function of higher priority of use. For example, in the case of the lens apparatus 21 of FIG. 4 described above, a higher priority is given to the shuttle shot switch; in the lens apparatus 22 of FIG. 5 endowed with the IS function, the IS function is of higher order of priority than the shuttle shot function, so a higher priority in arrangement is given to the IS enabling/disabling switch. In the lens apparatus 23 endowed with the AF function of FIG. 6, a higher priority in arrangement is given to the AF enabling/disabling switch.

In this way, of the functions of the lens apparatus to which the zoom demand 2 is connected, a function of higher frequency of use and of higher effectiveness is assigned to the AUX switch 11. When the function to be assigned has been determined, the procedure advances to Step S106, where the function to be assigned is set to the AUX switch 11. When connecting the demand to a lens apparatus, of the functions of the lens apparatus, a higher priority is given to a function of higher frequency of use and of higher effectiveness, and the functions are automatically assigned to the AUX switch 11 of the zoom demand 2 in order of priority. In this way, the function of the AUX switch 11 is automatically set to a function suitable for the function of the lens apparatus to which it is connected, so there is no need for a user to take the trouble to change the setting, thereby making it possible to readily use the AUX switch as a switch with the requisite function.

While in first Embodiment, when determining the function to be assigned to the AUX switch 11, the function to be assigned is determined through recognition of the lens name on the zoom demand 2 side; instead of the lens name, it is also possible to directly notice the function of the lens apparatus through communication.

Second Embodiment

Figure 8:
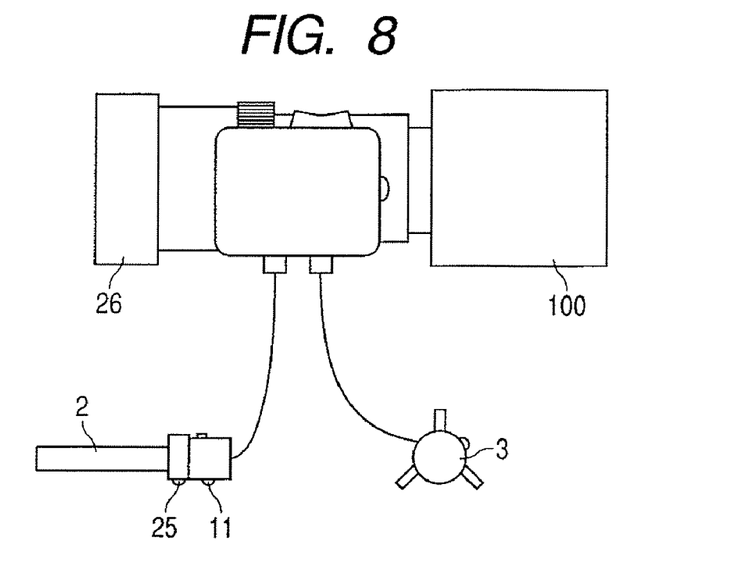
FIG. 8 is a schematic view of a zoom demand according to second Embodiment as connected to a lens apparatus.

While, in first Embodiment described above, one zoom demand 2 is connected to one lens apparatus, it is also possible to connect a plurality of demands to one lens apparatus as shown in FIG. 8. In second Embodiment shown in FIG. 8, a plurality of AUX switches are provided on the zoom demand 2; the reference numerals used are the same as those of first Embodiment. AUX switches 11 and 25 are arranged on the zoom demand 2, and effect enabling/disabling of the functions with which the lens apparatus 26 is endowed, such as quick zoom, shuttle shot, and preset.

Figure 9:
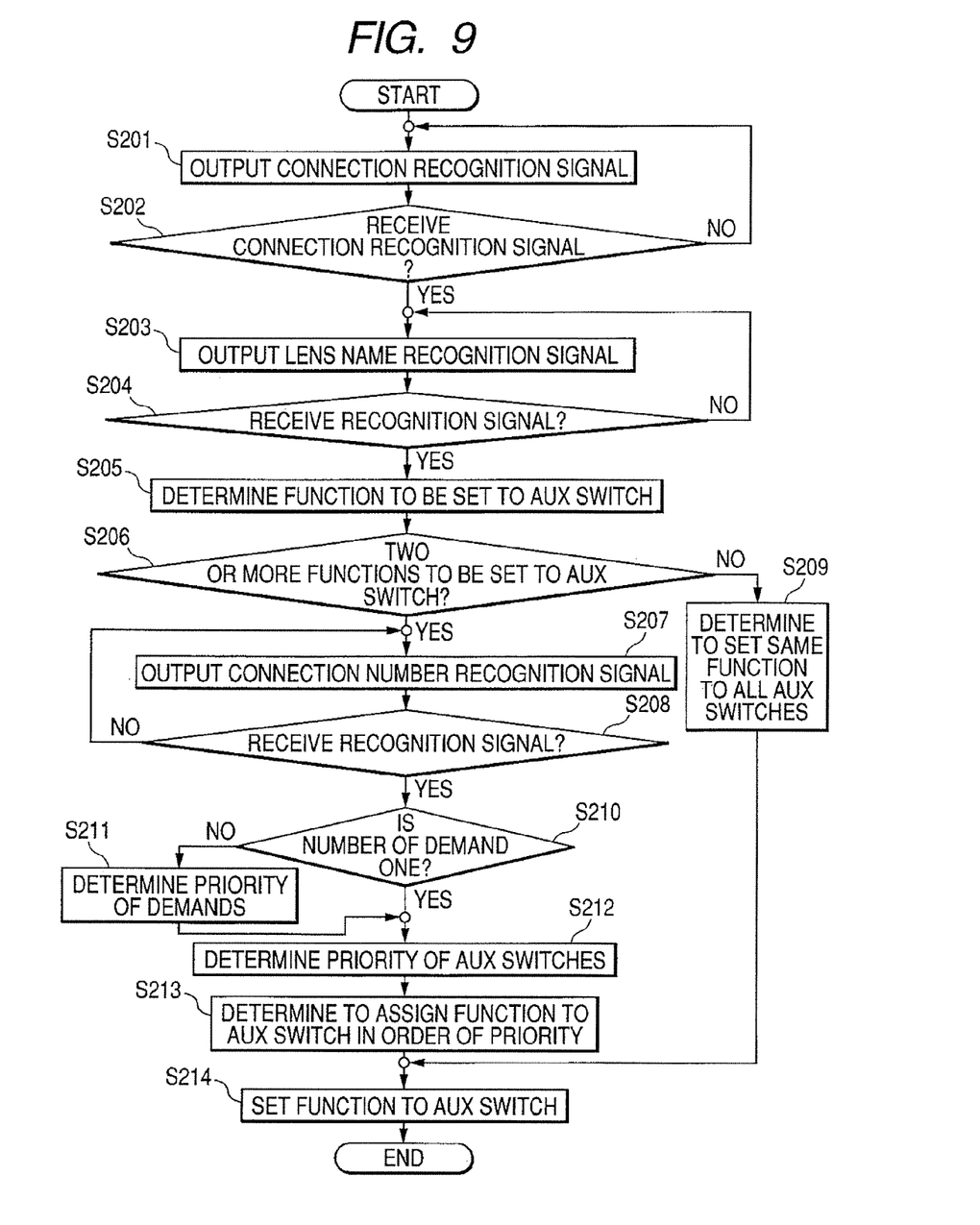
FIG. 9 is an operational flowchart of second Embodiment.

FIG. 9 is an operational flowchart for second Embodiment. When the zoom demand 2 is connected to the lens apparatus 26, a connection recognition signal is transmitted in Step S201 from the zoom demand 2 side to the lens apparatus 26 side through the communication conversion circuit 13. When the lens apparatus 26 and the zoom demand 2 are connected to each other, and the power source of the zoom demand 2 is turned on, it can be checked whether communication is possible between the lens apparatus 26 and the zoom demand 2 or not. This process also applies to the case in which the demand connected is a focus demand 3.

Next, in Step S202, the zoom demand 2 side waits for a response signal from the lens apparatus 26 upon the connection recognition signal; when no response signal is received, the procedure returns to Step S201 to output a connection recognition signal again. When a response signal upon the connection recognition signal is ascertained, the lens apparatus 26 and the zoom demand 2 are in a state of communicable, and the procedure advances to Step S203. When the communicable state is ensured, the lens apparatus 26 outputs a lens name recognition signal in Step S203 in order to determine the functions to be assigned to the AUX switches 11 and 25 on the zoom demand 2 side.

When the lens name recognition signal is not received in Step S204, the procedure returns to Step S203, and a lens name recognition signal is output again. When the lens name has been recognized, the procedure advances to Step S205, where the functions to be set to AUX switches 11 and 25 on the zoom demand 2 are determined based on the obtained lens name.

Next, the procedure advances to Step S206, where it is checked whether there are two or more functions to be set to the AUX switches 11 and 25. This checking is performed in order to determine the functions to be assigned to the AUX switches when the zoom demand 2 with two or more AUX switches 11 and 25 as shown in FIG. 8 are used or when there are a plurality of AUX switches as a result of connection of a plurality of demands to the lens apparatus. When there exists only one function to be set, the procedure advances to Step S209, where it is determined that the same function should be set to the AUX switches 11 and 25 of the connected zoom demand 2, and the procedure advances to Step S214.

When, in Step S206, the zoom demand 2 is connected to a lens apparatus 26 endowed with a plurality of functions, in Step S207, there is output a recognition signal to check whether only one zoom demand 2 is connected to the lens apparatus 26 or not.

In Step S208, the recognition signal from the lens apparatus 26 is received; when it is not received, the procedure returns to Step S207 to output a recognition signal again. When the recognition signal is received in Step S210, if the response signal upon the same indicates that a plurality of demands are connected to the lens apparatus 26, the procedure advances to Step S211, where the order of priority for the demands is determined. When there is only one demand, the procedure advances to Step S212; in each demand, there is determined, based on the demand priority determined, the order of AUX switches to which functions of the lens apparatus 26 is determined, in which a higher priory is given to functions, such as shuttle shot, enabling/disabling switching for the IS function and the AF function.

In Step S213, the assignment of the functions to the determined AUX switches is determined in order of priority. Then, in Step S214, based on the determined assignment, the functions are set to the AUX switches.

In this way, when a plurality of demands are connected to the lens apparatus 26 or when a plurality of AUX switches are mounted on one demand, an order or priority is imparted to the demands and the AUX switches. In this case, a function of high frequency of use and high effectiveness, with which the lens apparatus 26 is endowed, is assigned automatically based on the order of priority. By thus automatically setting the functions of the lens apparatus 26 to which the AUX switches are connected, there is no need for a user to take the trouble to change the setting, thus making it possible to readily use the switch as one endowed with the requisite function.

Third Embodiment

While, in first and second Embodiments described above, the assignment and setting of the function to the AUX switch is effected automatically, in third Embodiment, it is possible to effect switching between automatic setting and setting by a user.

Figure 10:
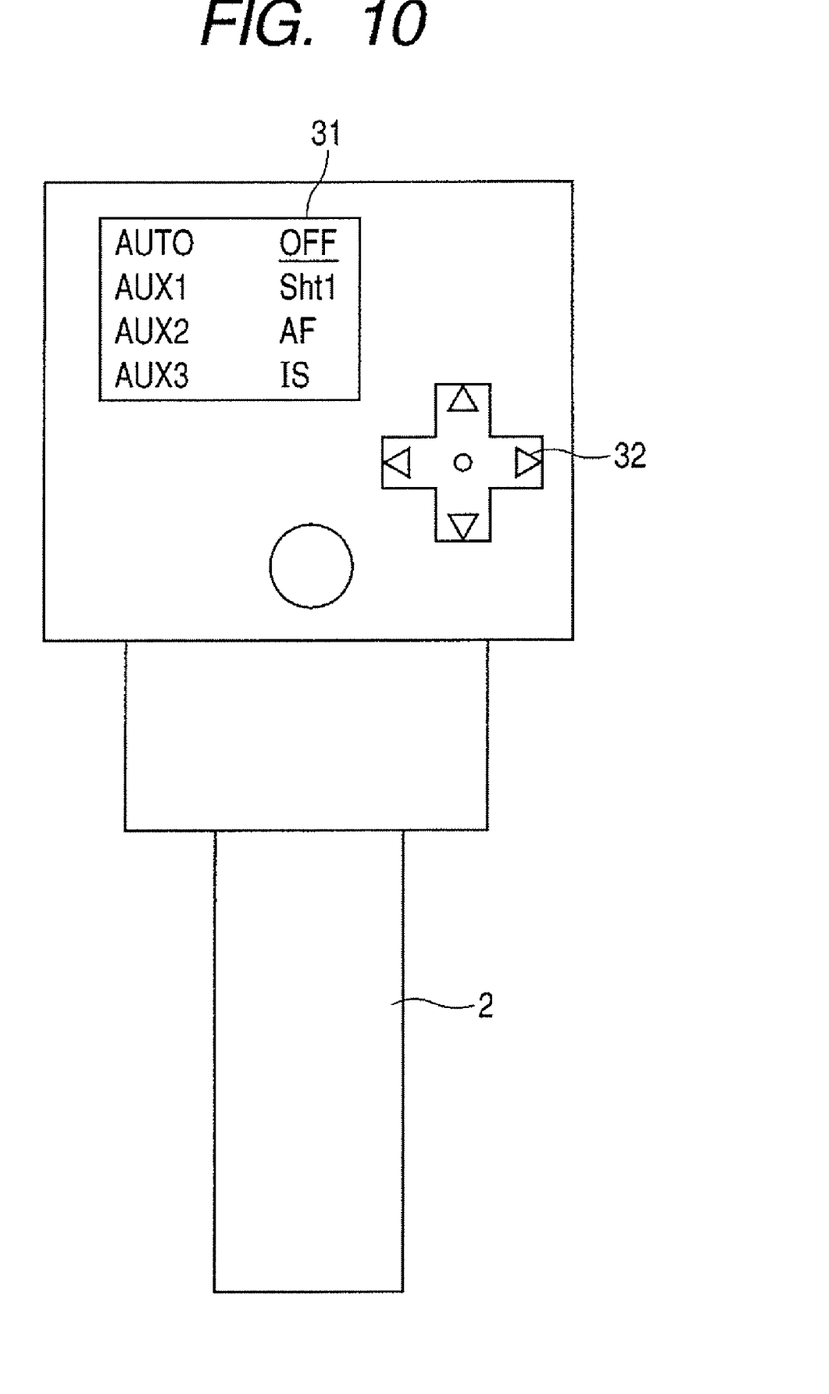
FIG. 10 is a structural view of a user mode setting portion according to third Embodiment.

FIG. 10 shows a display-type user mode setting portion 31 arranged on the zoom demand 2 and connected to the AUX user setting circuit 12 of FIG. 3, making it possible to effect switching between the user setting mode and the automatic setting mode, and the function assignment to the AUX switch. Provided in the user mode setting portion 31 are a setting item, referred to as AUTO, allowing selection between automatic AUX switch function assignment and manual AUX switch function assignment, and setting items, referred to as AUX 1 through 3, allowing setting as to which function is to be assigned to which AUX switch.

A changeover switch 32 is added to the user mode setting portion 31; the changeover switch 32 effects switching of the items of the user mode setting portion 31. With this construction, it is possible to effect selection as to whether the function assignment to the AUX switch when the zoom demand is connected to the lens apparatus is to be effected automatically or manually by the user. Using the changeover switch 32, the user moves a cursor where it is possible to change the setting, effecting enabling/disabling switching at the item AUTO. At the items AUX 1 through 3, changeover of switch functions such as shuttle shot (Shtl), AF, IS, etc. is effected.

Figure 11:
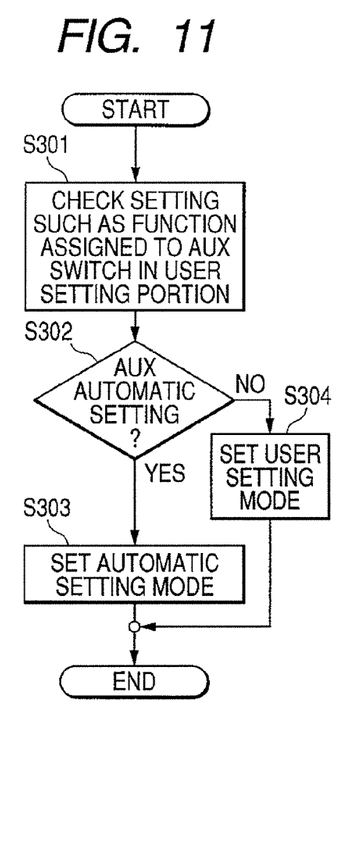
FIG. 11 is a flowchart for a user setting mode according to third Embodiment.

FIG. 11 is a flowchart for this user setting mode. In the CPU 8 in the zoom demand 2 shown in FIG. 3, the setting item in the user mode setting portion 31 is checked in Step S301, checking enabling/disabling at the AUTO setting item; in Step S302, it is checked whether the function assignment to the AUX switch is to be effected automatically or not. When, in Step S303, the item AUTO is ON, the system is in the automatic setting mode; when the item AUTO is OFF, the system is set to the user setting mode in Step S304.

Figure 12:
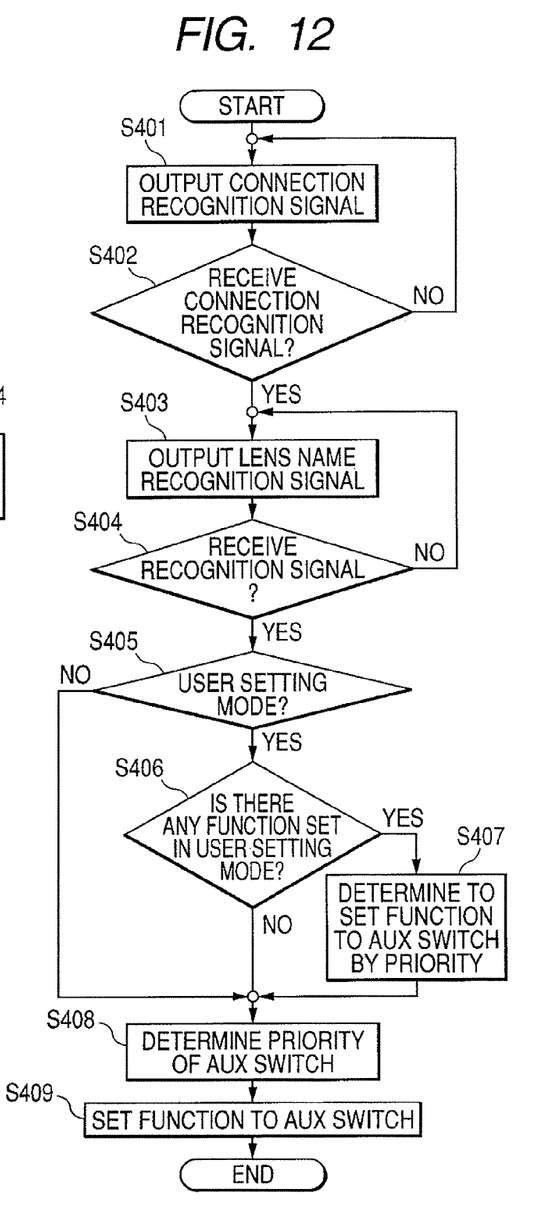
FIG. 12 is an operational flowchart for third Embodiment.

FIG. 12 is an operational flowchart for third Embodiment. When the zoom demand 2 is connected to the lens apparatus, a connection recognition signal is transmitted from the zoom demand 2 side to the lens apparatus side through the communication conversion circuit 13 in Step S401. When the lens apparatus and the zoom demand 2 are connected to each other, and the power source of the zoom demand 2 is turned on, it is checked whether it is possible for the lens apparatus to perform communication with the zoom demand 2.

Next, in Step S402, the zoom demand 2 side waits for a response signal from the lens apparatus upon the connection recognition signal; when no response signal is received, the procedure returns to Step S401 in order to output a connection recognition signal again. When the response signal upon the connection recognition signal is ascertained, the procedure advances to Step S403 when communication becomes possible between the lens apparatus and the zoom demand 2. When in Step S403 the communicable state is ensured, the lens apparatus outputs a lens name recognition signal in order to determine the function to be assigned to the AUX switch on the zoom demand side.

When in Step S404 the lens name cannot be recognized, the procedure returns to Step S403, where a lens name recognition signal is output. When the lens name is recognized, the procedure advances to Step S405, where it is checked whether the current mode is the user setting mode or not. This user setting mode set by the user mode setting portion 31 is checked through the display.

Based on the setting information of the user mode setting portion 31, the procedure advances to Step S408 when the current mode is not the user setting mode. When, in Step S405, the current mode is the user setting mode, the procedure advances to Step S406, where it is checked whether the connected lens apparatus is endowed with the function as set in the user mode setting portion 31.

When the function is set, that set function is assigned to the AUX switch in Step S407. When the function is not set, the system is placed in the automatic setting mode, and a function of higher order of priority is assigned to the AUX switch in Step S408. After the function to be assigned has been determined, the procedure advances to Step S409, where the function determined to be assigned to the AUX switch is set to the AUX switch.

In this way, when, with a zoom demand is connected to a lens apparatus, a function with which the lens apparatus is endowed is to be assigned to an AUX switch, it is possible for the user to select the setting of the assignment of the function. With this arrangement, it becomes possible to automatically assign a function which is of high frequency of use and which is effective, and to change the assignment to a state as desired by the user, thereby enabling the user to freely conduct the function assignment.

In the embodiments described above, when a zoom demand is connected to a lens apparatus, a function with which the lens apparatus is endowed is automatically set to a switch, whereby there is no need for the user to take the trouble to change the setting, and the user can use the switch readily as one providing the requisite function.

This application claims priority from Japanese Patent Application No. 2005-206767 filed on Jul. 15, 2005, which is hereby incorporated by reference herein.

What is claimed is:

1. A lens operation device connected to a lens apparatus and adapted to operate a function which the lens apparatus has, the lens operation device comprising:
   a plurality of switches including an auxiliary switch; and
   a controller which automatically detects the function of the lens apparatus and assigns execution of the function to the auxiliary switch upon connection to the lens apparatus,
   wherein the controller detects the function of the lens apparatus and assigns the detected function to the auxiliary switch based on a name recognition signal sent from the lens apparatus.

2. A lens operation device according to claim 1, wherein the controller selects a specific function from among a plurality of functions which the lens apparatus has in a predetermined order of priority and assigns execution of the specific function to the auxiliary switch.

3. A lens operation device according to claim 1, further comprising a setting switch for setting an order of priority for a plurality of functions which the lens apparatus has,
   wherein the controller assigns execution of a specific function assigned by the setting switch to the auxiliary switch.

4. A camera system comprising:
   a lens apparatus;
   a camera apparatus to which the lens apparatus is attached; and
   a lens operation device connected to the lens apparatus and adapted to operate a function which the lens apparatus has,
   wherein the lens operation device includes a plurality of switches including an auxiliary switch, and a controller which automatically detects the function of the lens apparatus and assigns execution of the function to the auxiliary switch upon connection to the lens apparatus, and
   wherein the controller detects the function of the lens apparatus and assigns the detected function to the auxiliary switch based on a name recognition signal sent from the lens apparatus.

5. A lens operation device connected to a lens apparatus and adapted to operate a function which the lens apparatus has, the lens operation device comprising:
   a plurality of switches including an auxiliary switch; and
   a controller for automatically and manually detecting the function of the lens apparatus and for assigning execution of the function to the auxiliary switch upon connection to the lens apparatus,
   wherein the controller detects the function of the lens apparatus and assigns the detected function to the auxiliary switch based on a name recognition signal sent from the lens apparatus.

6. A lens operation device according to claim 5, wherein the controller selects a specific function from among a plurality of functions which the lens apparatus has in a predetermined order of priority and assigns execution of the specific function to the auxiliary switch.

7. A lens operation device according to claim 5, further comprising a setting switch for setting an order of priority for a plurality of functions which the lens apparatus has,
   wherein the controller assigns execution of a specific function assigned by the setting switch to the auxiliary switch.

8. A camera system comprising:
   a lens apparatus;
   a camera apparatus to which the lens apparatus is attached; and
   a lens operation device connected to the lens apparatus and adapted to operate a function which the lens apparatus has,
   wherein the lens operation device includes a plurality of switches including an auxiliary switch, and a controller for automatically and manually detecting the function of the lens apparatus and for assigning execution of the function to the auxiliary switch upon connection to the lens apparatus, and
   wherein the controller detects the function of the lens apparatus and assigns the detected function to the auxiliary switch based on a name recognition signal sent from the lens apparatus.

* * * * *